Figure 1:
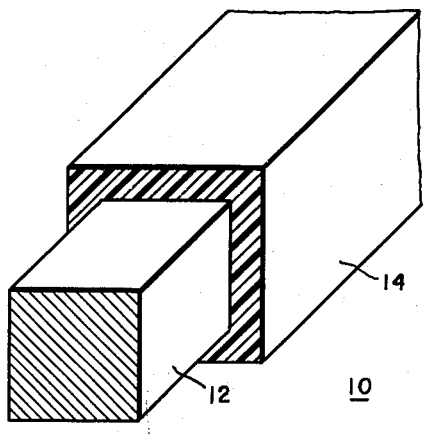

June 20, 1961    F. A. SATTLER ET AL    2,989,491
COMPOSITION COMPRISING POLYESTERAMIDE, EPOXY
RESIN AND ISOCYANATE MODIFIED CELLULOSE
ACETATE AND WIRE COATED THEREWITH
Filed June 5, 1958

WITNESSES:
Wm. B. Sellers.
Charles L. Menzemer

INVENTORS
Frank A. Sattler and
Floyd F. Trunzo.
BY
Frederick Shopor
ATTORNEY

United States Patent Office 2,989,491
Patented June 20, 1961

2,989,491
COMPOSITION COMPRISING POLYESTERAMIDE, EPOXY RESIN, AND ISOCYANATE MODIFIED CELLULOSE ACETATE AND WIRE COATED THEREWITH
Frank A. Sattler and Floyd F. Trunzo, Monroeville, Pa., assignors to Westinghouse Electric Corporation, East Pittsburgh, Pa., a corporation of Pennsylvania
Filed June 5, 1958, Ser. No. 740,076
3 Claims. (Cl. 260—16)

The present invention relates to electrical insulation and has particular reference to polyesteramide resins modified by cellulose acetate-isocyanate resins. The invention also relates to enamel coatings for conductors containing such modified resins and to metallic conductors coated with enamel compositions containing these resins.

Enamel coatings on metallic electrical conductors such as wire must be tough and hard to withstand the severe mechanical abuses to which the wire is subjected in service. Thus, coils frequently are wound from enameled wire under considerable tension and at high speeds. The enamel must withstand the abrasion, bending stresses and heavy tension encountered during such winding without breaking, cracking or otherwise separating from the wire.

After coils are wound, they usually are dipped in hot varnishes containing one or more of a variety of organic solvents and then baked at temperatures as high as 250° C. To be completely satisfactory, the enamel coating must be thermally stable and resistant to the action of varnishes, solvents, oils, grease, water, grit and dust that may be encountered in service.

Wire enamel solutions should be capable of being stored for long periods of time without substantially increasing in viscosity. Moreover, the enamel solutions should be capable of being applied to wire at relatively fast coating speeds and when applied should be capable of being baked or heat treated over a relatively wide range of temperatures to effect curing of the enamel on the wire. The applied cured coating of resins should be smooth and free from pinholes or other flaws. Furthermore, a thin coating of the cured enamel should possess a high dielectric strength and have other desirable insulating properties.

The wire enamels, available prior to this invention, were not completely satisfactory for application to rectangular conductors due to flow characteristics that tended to cause the enamel to flow away from the corners of the conductor before the enamel hardened.

The surprising discovery has now been made that by adding a critical amount of a specific resin, to be described more fully herein below, to a polyester-amide resin an enamel with excellent flow characteristics results which is particularly suitable for application to rectangular wire.

An object of the present invention is to provide a polyester-amide resin modified by certain critical amounts of a cellulose acetate-isocyanate resin.

Another object of the present invention is to provide an electrical insulating enamel suitable for applying to electrical conductors comprised of a polyester-amide resin modified by a cellulose acetate-isocyanate resin, said copolymer being dissolved in a suitable solvent therefor.

Another object of the present invention is to provide electrical conductors insulated with an enamel containing a polyester-amide resin modified by critical amounts of a cellulose acetate-isocyanate resin.

Other objects of the invention will, in part, be obvious and will, in part, appear hereinafter.

Figure 2:
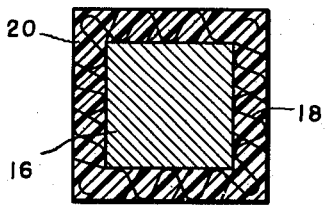

For a better understanding of the nature and objects of the invention, reference should be had to the following detailed description and drawing, in which:

FIGURE 1 is a fragmentary, perspective view, partly in cross section, of a rectangular electrical conductor provided with an enamel coating prepared in accordance with the teaching of this invention; and FIG. 2 is a cross-sectional view of a conductor insulated with a fibrous material impregnated with an enamel of this invention.

Broadly, in accordance with the present invention and in the attainment of the foregoing objects there is provided a resinous copolymer of (A) 60% to 90% by weight of a polyester-amide derived by reacting (a) at least one acidic compound selected from the group consisting of aliphatic ethylenically unsaturated dicarboxylic acids, aromatic dicarboxylic acids, anhydrides thereof, and dialkyl esters thereof, (b) at least one acidic compound having no ethylenic unsaturation selected from the group consisting of aliphatic dicarboxylic acids and their anhydrides, (c) at least on primary amine alcohol selected from the group consisting of monoethanolamine and monoisopropanolamine, (d) at least one primary diamine compound selected from the group consisting of ethylene diamine, propylene diamine, and urea, (e) at least one polyhydric alcohol, not over 75 mol percent of a polyhydric alcohol having more than three reactive hydroxyl groups, and (B) 40% to 10% by weight of the reaction product of (a) a diisocyanate and (b) cellulose acetate.

In accordance with another aspect of the present invention there is provided a thermosettable enamel comprising (A) 60% to 90% by weight of a polyester-amide derived by reacting (a) at least one acidic compound selected from the group consisting of aliphatic ethylenically unsaturated dicarboxylic acids, aromatic dicarboxylic acids, anhydrides thereof, and dialkyl esters of aromatic dicarboxylic acids, (b) at least one acidic compound having no ethylenic unsaturation selected from the group consisting of aliphatic dicarboxylic acids and their anhydrides, (c) at least one primary amine alcohol selected from the group consisting of monoethanolamine and monoisopropanol-amine, (d) at least one primary diamino compound selected from the group consisting of ethylene diamine, propylene diamine and urea, (e) at least one polyhydric alcohol, not over 75 mol percent of the polyhydric alcohol having more than three reactive hydroxyl groups, and (B) 40% to 10% by weight of the reaction product of (a) an isocyanate and (b) cellulose acetate and (C) a hydrocarbon solvent.

In accordance with another aspect of the present invention there is provided an insulated metallic electrical conductor comprising, in combination, an electrical conductor and heat-hardened solid resinous enamel insulation applied to the conductor, the resinous insulation comprising the copolymer described above derived by co-reacting from 60% to 90% by weight of a polyester-amide resin and 40% to 10% by weight of a cellulose acetate-isocyanate resin.

The invention also contemplates using cellulose acetate-isocyanate resins to modify polyester-amide resins which latter resins have been reacted previously with from 1% to 50% by weight of a glycidyl polyether resin. Such fully modified resins also may be used in preparing the wire enamels and finished insulated conductors herein described and claimed.

Cellulose acetate-isocyanate resins which are suitable for use in accord with this invention may be prepared, for example, by admixing at about 100° C., and while sparging with an inert gas, in amounts of from 30% to 75% by weight cellulose acetate, dissolved in a suitable solvent, with from 70% to 25% by weight of one or more diisocyanates, dissolved in a suitable solvent. Up to about 5% by weight of the cellulose acetate may be replaced by other cellulose esters. Cellulose acetate-butyrate, cellulose butyrate and cellulose acetate-propionate and mixtures of two or more may be used for this purpose. Cellulose acetate alone, however, has given excellent results. Accordingly, esters of cellulose with organic acids having from 2 to 4 carbon atoms per molecule can be employed.

Examples of suitable isocyanates include 2,4-tolylene diisocyanate, 2,6-tolylene diisocyanate, dianisidine diisocyanate, methylene bis(p-phenylene isocyanate), 3,3′ bitolylene 4,4′ diisocyanate, and mixtures of two or more.

Examples of suitable solvents in which the reaction may be carried out include ortho cresol, para cresol, cresylic acid, phenol (hydroxy benzene) and mixtures thereof.

The reaction is carried on for approximately one hour at approximately 100° C. to 105° C. to insure substantially complete reaction. The reaction product then is diluted with 3 to 5 volumes of a solvent mixture containing approximately 3 parts by volume of m,p-cresol to 1 part by volume of xylene.

A glycidyl polyether resin, also known as an epoxy resin, suitable for use in accord with this invention may be prepared by reacting predetermined amounts of at least one polyhydric phenol or polyhydric alcohol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4′-dihydroxy-diphenyl-dimethyl-methane (referred to hereinafter as bisphenol "A"), 4,4′-dihydroxy-diphenyl-methyl-methane and 4,4′-dihydroxy-diphenyl-methane. In admixture with the named polynuclear phenols, use also may be made of those polynuclear phenols wherein the phenol nuclei are joined by sulfur bridges, such for example as 4,4′-dihydroxy-diphenyl-sulfone. Polyhydric alcohols are glycerol, propylene glycol and 1,5-pentanediol.

While it is preferred to use epichlorohydrin as the epihalohydrin in the preparation of the resinous polymeric epoxide starting materials of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The product of the reaction, instead of being a single simple compound, is generally a complex mixture of glycidyl polyethers, but the principal product may be represented by the formula:

where $n$ is an integer of the series 0, 1, 2, 3 . . . and R represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol suitable for use in this invention, has a 1,2-epoxy equivalency greater than 1.0. By epoxy equivalency reference is made to the average number of 1,2-epoxy groups

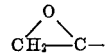

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the poylethers is thus a value between 1.0 and 2.0.

The 1,2-epoxide value of the glycidyl polyether is determined by heating a weighted sample of the ether with an excess of 0.2 N pyridinium chloride in chloroform solution at the boiling point under reflux for 2 hours whereby the pyridinium chloride hydrochlorinates the epoxy groups to chlorohydrin groups. After cooling, the excess pyridinium chloride is back-titrated with 0.1 N sodium hydroxide in methanol to the phenolphthalein end point.

Resinous polymeric epoxides or glycidyl polyethers suitable for use in accordance with this invention may be prepared by admixing and reacting from one to two mol proportions of epihalohydrin, preferably epichlorohydrin, with about one mol proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed and the epichlorohydrine added thereto, or an aqueous solution of alkali and bis-phenol "A" may be added to the epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

The resinous epoxide composition with a ball and ring softening temperature of from 40° C. to 140° C. is preferably dissolved in a large excess of solvent, such for example as cresylic acid, cresol and liquid phenols. The solution of the resinous epoxide composition is then suitable for use in accord with the teachings of this invention.

A polyester-amide suitable for use in accord with this invention may be prepared using the following components:

(a) A predetermined quantity of at least one acidic compound selected from the group consisting of aliphatic ethylenically unsaturated dicarboxylic acids, aromatic dicarboxylic acids, anhydrides thereof, and dialkyl esters of aromatic dicarboxylic acids, examples of which include maleic acid, maleic anhydride, citraconic acid, citraconic anhydride, aconitic acid, fumaric acid, 3,6-endomethylene-Δ-4-tetrahydrophthalic anhydride, dilinoleic acid, phthalic acid, isophthalic acid and methyl terephthalic acid, either singly or in mixtures of two or more.

(b) A predetermined quantity of at least one acidic compound having no ethylenic unsaturation selected from the group of aliphatic dicarboxylic acids and their anhydrides having at least two noncarboxyl carbon atoms and having no other reactive groups than the carboxyl or anhydride groups; examples of which include adipic acid, succinic acid, azelaic acid, diglycolic acid, and sebacic acid.

(c) A predetermined quantity of at least one amine alcohol, the amine alcohol component comprising at least 75 mol percent of at least one primary amine alcohol selected from the group consisting of monoethanolamine and monoisopropanolamine and up to 25 mol percent may comprise diethanolamine or other secondary amine alcohol, no other reactive group than the amino group and the hydroxyl group being present.

(d) A predetermined quantity of a primary diamine compound; the primary diamine compound comprising at least one selected from the group consisting of ethylene diamine, propylene diamine and urea.

(e) A predetermined quantity of at least one polyhydric alcohol, not more than 75 mol percent of the polyhydric alcohol having more than three reactive hydroxy groups. Examples of suitable polyhydric alcohols include glycerol, ethylene glycol, diethylene glycol, pentaerythritol, 1,1,1-trimethylpropane, 1,4-butanediol, 1,6-hexanediol, paraffinic glycols with up to eight carbon atoms in a chain, either singly or in mixtures thereof. The hydroxyl groups are substantially the only reactive groups in these polyhydric alcohols.

The components (a), (b), (c), (d) and (e) employed for preparing the polyester amide should be so proportioned that there is a stoichiometric balance of acid and anhydride groups to the total of the hydroxy and amine groups, with not more than 10 mol percent excess of hydroxy and amine groups to the carboxyl and anhydride groups.

Highly satisfactory polyester-amide resins may be prepared by reacting the above components either exposed to the atmosphere or in a closed reaction vessel while sparging with an inert gas such as, for example, nitrogen. The reaction is not critical as to the order in which the ingredients are admixed. It may be necessary to add some of the ingredients slowly in order that the initial reaction on contact not be too violent. After all the ingredients have been added, the reaction mixture may be heated at a rate to reach a temperature of from 140° C. to 210° C. in about one hour. However, the rate of heating ordinarily is preferably conducted more slowly with batches of 25 gallons or larger. For example, in a large reaction vessel it may take as much as ten hours to reach a temperature of 145° C. Good results have been attained when the heating was such as to reach the temperature of 160° C. in the reaction vessel in six hours.

A polyester-amide resin may be modified with a cellulose acetate-isocyanate resin in accordance with this invention by admixing (A) 10% to 40% by weight of the cellulose acetate-isocyanate resin described above with from (B) 90% to 60% by weight of the polyester-amide resin prepared as described above, the components being admixed in the presence of a suitable solvent, for example, cresol. The resultant admixture may be diluted to a suitable viscosity by the addition of additional solvent, for example, cresol, xylene, or the like.

Solutions of the cellulose acetate-isocyanate-modified polyester-amide resin may be employed in coating wire either by dip coating, die-coating or the like techniques. Furthermore, coils and other electrical members may be dipped or impregnated in these compositions.

Wire enamel may be prepared utilizing the herein described cellulose acetate-isocyanate-epoxy-modified polyester-amide by forming a solution comprising (A) from 10% to 40% by weight cellulose acetate-isocyanate resin prepared as described above, (B) from 90% to 60% by weight polyester-amide resin prepared as described above and (C) 1% to 50% by weight epoxy resin as described above, and a suitable hydrocarbon solvent.

In combining the above three components to form a cellulose acetate-isocyanate-epoxy-modified polyester-amide wire coating enamel, the resinous epoxy composition, with a ball and ring softening temperature of from 65° C. to 135° C. and preferably dissolved in a large excess of a solvent such, for example, as cresylic acid, cresol, phenol and the like, is introduced into the reaction vessel containing the polyester-amide composition and reacted therewith. The reaction of the epoxy resin and the polyester-amide resin is carried out at a temperature above 100° C. in order to promote copolymerization or condensation. The reaction temperature is increased at the rate of approximately 10° C. per hour until a temperature of approximately 200° C. is reached. At approximately 200° C. the resin solution becomes viscous and thread-forming. At this point the epoxy-modified-polyester-amide may be diluted with a suitable solvent, for example cresol, and the resultant solution reacted with the cellulose acetate-isocyanate resin prepared as described above. The admixture and reaction may be accomplished by agitation and heating the mixture at a temperature of 150° C. for approximately two hours. The cellulose acetate-isocyanate-epoxy polyester-amide resin may be employed, when diluted with a suitable hydrocarbon solvent, in the coating of rectangular electrical conductors by any of the known techniques. Furthermore, coils and other rectangular electrical members may be dipped or impregnated in this composition.

In order to illustrate the invention even more fully, the following specific examples are set forth. The parts given are by weight unless otherwise indicated.

*Example I*

(a) 117.8 parts of maleic anhydride, 117 parts of adipic acid and 62.1 parts of ethylene glycol were charged into a suitable reaction vessel. 61.1 parts of monoethanolamine was added dropwise to the other ingredients over a 15-minute period. The reaction mixture was heated from approximately 140° C. to approximately 190° C. at a rate of approximately 6° C. to 10° C. per hour while sparging with nitrogen. At 190° C. the resultant polyester-amide resinous mixture became viscous and thread-forming.

The procedure of paragraph (a) above was repeated to prepare a polyester-amide resin using the following reactants:

| | Parts |
|---|---|
| (b) | |
| Maleic anhydride | 117.8 |
| Adipic acid | 117.0 |
| Monoethanolamine | 61.0 |
| Glycerol | 61.5 |
| (c) | |
| Maleic anhydride | 117.8 |
| Adipic acid | 117.0 |
| Monoethanolamine | 61.0 |
| Glycerol | 83.0 |
| (d) | |
| Maleic anhydride | 117.8 |
| Adipic acid | 117.0 |
| Monoethanolamine | 61.1 |
| Ethylene glycol | 31.1 |
| Pentaerythritol | 34.1 |
| (e) | |
| Maleic anhydride | 117.8 |
| Adipic acid | 117.0 |
| Monoethanolamine | 61.1 |
| Trimethylolpropane | 120.7 |

(f)

| | Parts |
|---|---|
| Maleic anhydride | 117.8 |
| Adipic acid | 117.0 |
| Monoethanolamine | 61.1 |
| 1-2,4-butanetriol | 70.8 |

Example II (a) A polyester-amide resin was prepared by reacting the following as set forth in Example I(a). Part I: Dimethylterephthalate 77.6 parts, glycerol 83 parts, lead acetate .2 part, cresol 25 milliliters. The reaction mixture was heated while undergoing nitrogen sparging until the resin appeared clear. Part II: There then is added to Part I adipic acid 58.4 parts, maleic anhydride 117.8 parts, monoethanolamine 61.1 parts. The reaction was continued with heating at the rate of 10° C. per hour until the mixture reached a temperature of approximately 190° C. at which time the mixture was in the thread-forming stage.

The procedure of Example II, paragraph (a) above was repeated to prepare polyester-amide resins using the following reactants:

(b)

Part:
| Isophthalic acid | parts | 66.4 |
|---|---|---|
| Glycerol | do | 83.0 |
| Cresol | ml | 25 |

Part II:
| Maleic anhydride | parts | 117.8 |
|---|---|---|
| Adipic acid | do | 58.5 |
| Monoethanolamine | do | 61.1 |
| Glycerol | do | 83.0 |

(c)

Part I:
| Isophthalic acid | parts | 66.4 |
|---|---|---|
| Glycerol | do | 72.6 |
| 1-5 pentanediol | do | 17.7 |
| Cresol | ml | 25 |

Part II:
| Adipic acid | parts | 58.4 |
|---|---|---|
| Maleic anhydride | do | 117.8 |
| Monoethanolamine | do | 61.1 |

(d)

Part I:
| Isophthalic acid | parts | 132.8 |
|---|---|---|
| Glycerol | do | 41.3 |
| 1-5 pentanediol | do | 70.8 |

Part II:
| Maleic anhydride | parts | 117.8 |
|---|---|---|
| Monoethanolamine | do | 61.1 |

Example III

Four mols of 4,4'-dihydroxydiphenyl-2,2-propane and five mols of epichlorohydrin were added to an aqueous caustic soda solution containing approximately 6.43 mols of sodium hydroxide. The reaction mixture was heated slowly from an initial temperature of 40° C. to 100° C. in a period of approximately 80 minutes. The reaction was allowed to continue for approximately one hour at a temperature in the range of from 100° C. to 104° C. The reaction mixture was then permitted to stand until it separated into two layers. An upper aqueous layer was drawn off and discarded. The lower layer containing the resinous reaction product was first washed with water several times and the water withdrawn to remove excess caustic. Dilute acetic acid was then stirred into the mixture to neutralize any remaining unreacted caustic. Further washing in water was carried out until the washing was neutral to litmus. The water was separated from the resinous reaction product by decantation and the reaction product was then heated to 150° C. to remove all additional traces of water. The heating was continued until the softening point of the resinous reaction product was 70° C. as determined by the ball and ring test.

Example IV

Approximately 35.8 grams of the epoxy resin of Example III, dissolved in 112.1 parts of m,p-cresol, was added to the viscous polyester-amide resins of Example I(a) to (f) and Example II(a) to (d) with heating until a temperature of 200° C. was reached. This heating required approximately three hours. At 200° C. the epoxy-modified polyester-amide reaction product was viscous and thread-forming. The resultant copolymers comprised 99% to 50% by weight of polyester-amide and 1% to 50% by weight epoxy resin.

Example V

Approximately 60 parts of cellulose acetate dissolved in approximately 172 parts of m,p-cresol were admixed with approximately 42 parts of tolylene diisocyanate dissolved in approximately 26 parts of cresol. The resultant mixture was sparged with nitrogen while heating for a period of approximately one hour at a temperature of approximately 105° C.

Example VI

Ten different resin mixtures were made by admixing and reacting the cellulose acetate-isocyanate resin of Example V with each of the polyester-amide resins of Example I(a) to (f) and Example II(a) to (d). The admixing and reacting were effected by agitation and heating at a temperature of 150° C. for two hours to form a cellulose acetate-isocyanate modified polyester-amide resin. The resultant copolymer was comprised of 60% to 90% by weight of polyester-amide resin and 40% to 10% by weight of cellulose acetate-isocyanate resin.

Example VII

The cellulose acetate-isocyanate resin of Example V was admixed and reacted with the epoxy modified polyester-amide resins of Example IV. The admixing and reacting were effected by agitation and heating at a temperature of 150° C. for two hours to form a cellulose acetate-isocyanate epoxy modified polyester-amide resin. The resultant copolymer was comprised of 60% to 90% by weight polyester-amide resin, 40% to 10% by weight cellulose acetate-isocyanate resin and 1% to 50% by weight epoxy resin.

Example VIII

Insulating enamels suitable for coating electrical conductors were formed by diluting and admixing the several cellulose acetate-isocyanate and polyester-amide copolymers of Example VI with quantities of xylene sufficient to form enamels comprised of 60% to 80% by weight of copolymer and 40% to 20% by weight of xylene.

Example IX

An insulating enamel suitable for coating electrical conductors was formed by diluting and admixing the cellulose acetate-isocyanate epoxy modified polyester-amide resins of Example VII with a quantity of cresol sufficient to form a mixture comprised of 60% to 80% by weight of copolymer and 40% to 20% by weight of cresol.

The enamels prepared as described may be employed for coating metal electrical conductors. Referring to the drawing, there is illustrated a conductor 10 comprising a rectangular copper conductor 12 coated with a hard, tough, solid, resinous enamel 14 produced by applying a specific solvent solution of the isocyanate polyester-amide resin of this invention thereto and curing by heat treatment. It will be understood that the coating 14 may be applied by any suitable means, such as by dipping, die-coating, or the like. In the drawing, the enamel coatings illustrated are shown to be quite thick for clarity of illustration only.

One method particularly suitable for applying the enamels prepared in accordance with this invention to conductors comprises, passing an electrical conductor, for example, wire through an enamel solution, and then passing it through a drying tower to remove the enamel solvent and effect a cure of the enamel. Satisfactory results have been realized when No. 17 A.W.G. copper wire and rectangular copper wire having a dimension of .051 x .162 inch were passed through the enamel and a 15 foot drying and curing tower at velocities of from 9 feet to 17 feet per minute and at tower temperatures varying from 400° C. to 475° C.

Conductor 10, while described as being copper, may be of a metal such as copper, aluminum, silver, either alone or as plated or clad combinations or alloys, as well as nickel-chromium alloys, stainless steel alloys, anodized aluminum or the like. After curing by heating, coating 14 adheres tenaciously to the copper conductor 12. While the conductor 12 is illustrated as being rectangular in cross section, as indicated hereinabove, it may be of any other desirable cross section.

The enamels of the present invention also may be applied to electrical conductors such as wire in combination with coatings of both organic and inorganic fibrous materials. One form of such a modification is illustrated in FIG. 2. A copper wire 16 is provided with an exterior coating 18 of fibrous material, which may be glass fibers, asbestos fibers, paper, cotton, silk and the like either wrapped or braided or woven, or various combinations thereof. A quantity of the enamel 20 of this invention is impregnated into the fibrous coating 18 and baked to provide a composite insulation about copper wire 16.

*Example X*

The enamels of Example VIII were coated on rectangular copper wire having the dimensions .051 inch x .162 inch by the process described above. The wire was passed through the enamel solution and a 15 foot drying tower at speeds ranging from 9 feet to 14 feet per minute and drying tower temperatures varying from 425° C. to 475° C.

Twisted samples of wire coated at these various speeds and temperatures were tested for thermal stability according to American Institute of Electrical Engineering Test No. 57 at 200° C. and at 225° C.

The scrape hardness of the enamel coated wires were determined in accordance with the procedure and apparatus described and claimed in U.S. Patent 2,372,093 to Leape et al., which patent is assigned to the same assignee as this present invention.

The heat shock of the enamels was determined by heating in an air circulating oven, for one hour, lengths of enamel coated wires which have been wound about mandrels having the same diameter as the coated wire.

Typical test results are indicated below:

| | |
|---|---|
| Thermal life | 1700 hours at 200° C.; 422 hours at 225° C. |
| Scrape hardness | 40 to 57 ounces. |
| Heat shock | 125° C. |
| Dielectric strength | 5000 to 8000 volts. |

Equally satisfactory results were obtained when the enamels of Example VIII were coated on No. 17 A.W.G. circular copper wire.

*Example XI*

The enamels of Example IX were coated on rectangular copper wire and tested as set forth in Example X.

Typical results are indicated below:

| | |
|---|---|
| Thermal life | 1562 hours at 200° C.; 233 hours at 225° C. |
| Scrape hardness | 45 to 74 ounces. |
| Heat shock | 125° C. |
| Dielectric strength | 5000 to 8000 volts. |

Equally satisfactory results were obtained when the enamels of Example IX were coated on No. 17 A.W.G. circular copper wire.

Since certain changes in carrying out the above processes and in the product embodying the invention may be made without departing from its scope, it is intended that the accompanying description and drawing be interpreted as illustrative and not limiting.

We claim as our invention:

1. A resin composition comprising from 99 to 50 parts by weight of a resinous copolymer derived by admixing and heating of (A) 60% to 90% by weight of a polyesteramide derived by reacting (a) at least one acidic compound selected from the group consisting of aliphatic ethylenically unsaturated dicarboxylic acid, aromatic dicarboxylic acids, anhydrides thereof, and dialkyl esters of aromatic dicarboxylic acids, (b) at least one acidic compound having no ethylenic unsaturation selected from the group consisting of aliphatic dicarboxylic acids and their anhydrides, (c) at least one primary amine alcohol selected from the group consisting of monoethanolamine and monoisopropanolamine, (d) at least one polyhydric alcohol, not over 75 mol percent of the polyhydric alcohol having more than three reactive hydroxyl groups, (B) from 40% to 10% by weight of the reaction product of (a) from 70% to 25% by weight of an isocyanate selected from at least one of the group consisting of tolylene diisocyanate, dianisidine diisocyanate, methylene bis (p-phenylene isocyanate), 3,3' bitolylene 4,4' diisocyanate and (b) cellulose acetate, and from 1 to 50 parts by weight of the reaction product of (a) a polyhydric phenol having at least two phenolic hydroxyl groups per molecule and (b) an epihalohydrin.

2. A thermosettable enamel comprising from 99 to 50 parts by weight (A) 60% to 90% by weight of a polyester-amide derived by reacting (a) at least one acidic compound selected from the group consisting of aliphatic ethylenically unsaturated dicarboxylic acid, aromatic dicarboxylic acids, anhydrides thereof and dialkyl esters of aromatic dicarboxylic acids, (b) an acidic compound having no ethylenic unsaturation selected from the group consisting of aliphatic dicarboxylic acids and their anhydrides, (c) at least one primary amine alcohol selected from the group consisting of monoethanolamine and monoisopropanolamine, (d) at least one polyhydric alcohol, not over 75 mol percent of the polyhydric alcohol having more than three reactive hydroxyl groups, (B) from 40% to 10% by weight of the reaction product of (a) from 70% to 25% by weight of an isocyanate selected from at least one of the group consisting of tolylene diisocyanate, dianisidine diisocyanate, methylene bis (p-phenylene isocyanate), 3,3' bitolylene 4,4' diisocyanate and (b) from 30% to 75% by weight of cellulose acetate, and 1 to 50 parts by weight of the reaction product of (a) a polyhydric phenol having at least two phenolic hydroxyl groups per molecule and (b) an epihalohydrin, and (C) a solvent selected from the group consisting of cresols and xylene.

3. An insulated conductor comprising, in combination, an electrical conductor and cured solid resinous insulation applied to the conductor, the resinous insulation comprising from 99 to 50 parts by weight of the copolymer of (A) 60% to 90% by weight of the reaction product of (a) an acidic component selected from the group consisting of aliphatic ethylenically unsaturated dicarboxylic acids, aromatic dicarboxylic acids, anhydrides thereof, and dialkyl esters of aromatic dicarboxylic acids, (b) at least one acidic compound having no ethylenic unsaturation selected from the group consisting of aliphatic dicarboxylic acids and their anhydrides, (c) at least one primary amine alcohol selected from the group consisting of monoethanolamine and monoisopropanolamine, (d) at least one polyhydric alcohol, not over 75 mol percent of the polyhydric alcohol having more than three reactive hydroxyl groups, and (B) from 40% to 10% by weight of the reaction product of (a) from 70% to 25% by weight of an isocyanate selected from at least one of the group consisting of tolylene diisocyanate, dianisidine diisocyanate, methylene bis (p-phenylene isocyanate), 3,3' bitolylene 4,4' diisocyanate and (b) cellulose acetate, and from 1 to 50 parts by weight of the reaction product of (a) a polyhydric phenol having at least two phenolic hydroxyl groups per molecule and (b) an epihalohydrin.

References Cited in the file of this patent

UNITED STATES PATENTS

| | | |
|---|---|---|
| 2,284,896 | Hanford et al. | June 2, 1942 |
| 2,333,639 | Christ et al. | Nov. 9, 1943 |
| 2,333,922 | Foster | Nov. 9, 1943 |
| 2,523,999 | Sattler et al. | Sept. 26, 1950 |
| 2,626,223 | Sattler et al. | Jan. 10, 1953 |